United States Patent
Lu et al.

(10) Patent No.: US 12,437,818 B2
(45) Date of Patent: Oct. 7, 2025

(54) CORRECTIVE PROGRAM VERIFY OPERATION WITH IMPROVED READ WINDOW BUDGET RETENTION

(71) Applicant: Micron Technology, Inc., Boise, ID (US)

(72) Inventors: Ching-Huang Lu, Fremont, CA (US); Hong-Yan Chen, San Jose, CA (US); Yingda Dong, Los Altos, CA (US)

(73) Assignee: Micron Technology, Inc., Boise, ID (US)

( * ) Notice: Subject to any disclaimer, the term of this patent is extended or adjusted under 35 U.S.C. 154(b) by 161 days.

(21) Appl. No.: 18/233,420

(22) Filed: Aug. 14, 2023

(65) Prior Publication Data

US 2024/0071530 A1    Feb. 29, 2024

Related U.S. Application Data

(60) Provisional application No. 63/400,511, filed on Aug. 24, 2022.

(51) Int. Cl.
  *G11C 16/34*      (2006.01)
  *G11C 16/08*      (2006.01)
  *G11C 16/10*      (2006.01)

(52) U.S. Cl.
  CPC .......... *G11C 16/3459* (2013.01); *G11C 16/08* (2013.01); *G11C 16/102* (2013.01)

(58) Field of Classification Search
  CPC ..................................................... G11C 16/08
  See application file for complete search history.

(56) References Cited

U.S. PATENT DOCUMENTS

| | | | | |
|---|---|---|---|---|
| 10,510,413 | B1 * | 12/2019 | Diep ...................... | G11C 16/10 |
| 10,978,153 | B1 * | 4/2021 | Liu ....................... | G11C 11/5642 |
| 11,475,967 | B1 * | 10/2022 | Pitner .................... | G11C 16/26 |
| 2008/0084755 | A1 * | 4/2008 | Mokhlesi ............. | G11C 11/5642 |
| | | | | 365/185.23 |
| 2008/0158949 | A1 * | 7/2008 | Mui ..................... | G11C 7/1006 |
| | | | | 365/189.05 |
| 2011/0026331 | A1 * | 2/2011 | Dong ................. | G11C 16/0483 |
| | | | | 365/185.19 |
| 2022/0415419 | A1 * | 12/2022 | Shin ................... | G11C 16/3459 |
| 2023/0090656 | A1 * | 3/2023 | Lim ..................... | G11C 16/08 |
| | | | | 365/185.22 |
| 2024/0071484 | A1 * | 2/2024 | Bertuccio ........... | G11C 11/5671 |

\* cited by examiner

*Primary Examiner* — Douglas King

(74) *Attorney, Agent, or Firm* — Lowenstein Sandler LLP

(57) ABSTRACT

A program operation is initiated to program a set of target memory cells of a target wordline of a memory device to a target programming level. During a program verify operation of the program operation, a program verify voltage level is caused to be applied to the target wordline to verify programming of the set of target memory cells. A pass through read voltage level associated with the target wordline is identified. During the program verify operation, a pass through voltage level is caused to be applied to at least one of a first wordline or a second wordline, wherein the pass through read voltage level is the read voltage level reduced by an offset value.

20 Claims, 12 Drawing Sheets

FIG. 3

CORRECTIVE PROGRAM VERIFY OPERATION WITH IMPROVED READ WINDOW BUDGET RETENTION

CROSS-REFERENCE TO RELATED APPLICATION

This application claims the benefit of U.S. Provisional Application No. 63/400,511, titled "Corrective Program Verify Operation with Improved Read Window Budget Retention," filed Aug. 24, 2022, which is hereby incorporated herein by reference in its entirety.

TECHNICAL FIELD

Embodiments of the disclosure relate generally to memory sub-systems, and more specifically, relate to performing a corrective program verify operation with improved read window budget retention.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a block schematic of a portion of an array of memory cells as could be used in a memory of the type described with reference to FIG. 1B, in accordance with one or more embodiments of the present disclosure.

DETAILED DESCRIPTION

Figure 1A:
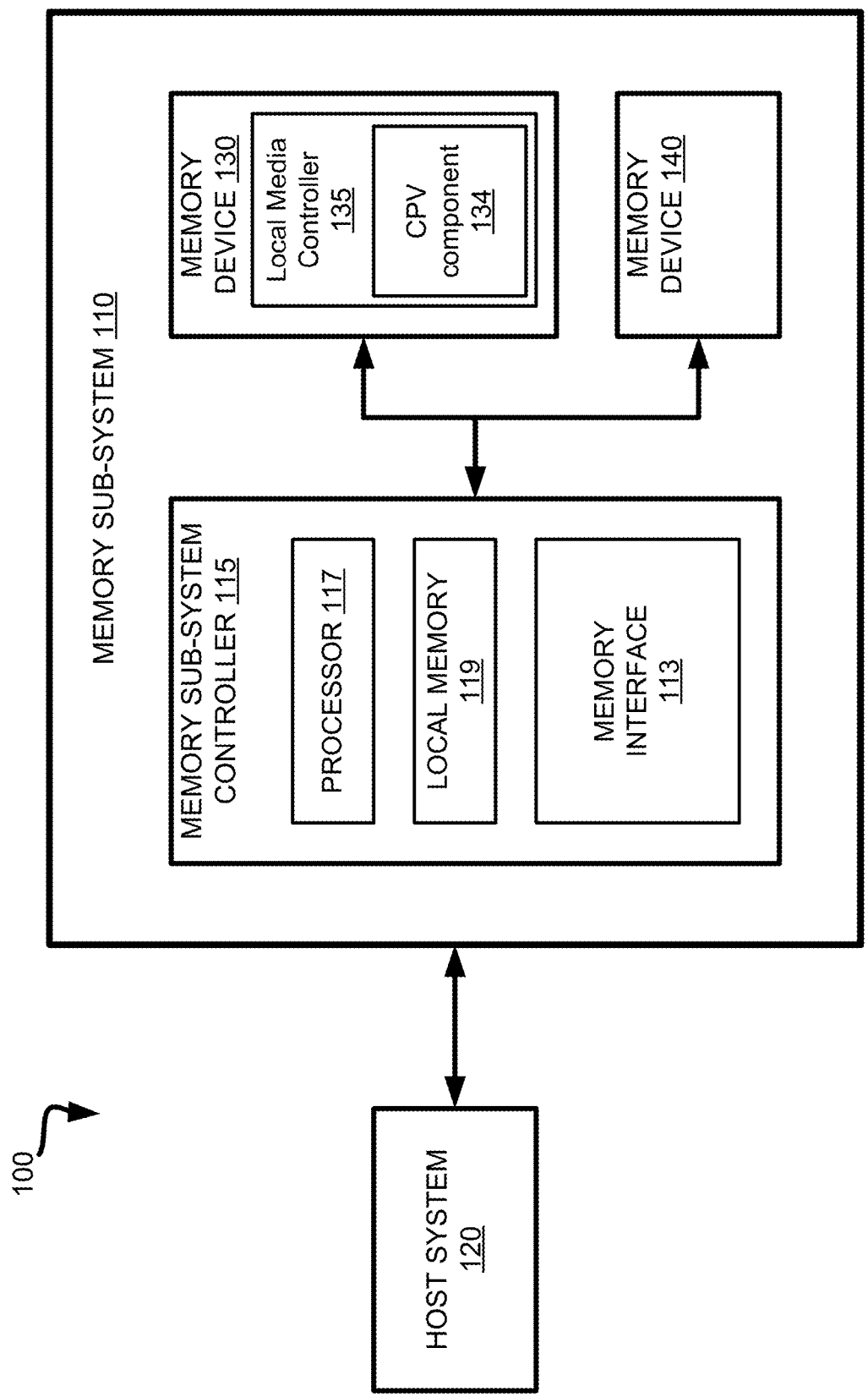
FIG. 1A illustrates an example computing system that includes a memory sub-system, in accordance with one or more embodiments of the present disclosure.

Aspects of the present disclosure are directed to corrective program verify operations. A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIGS. 1A-1B. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device (e.g., a memory die) can include memory cells arranged in a two-dimensional or a three-dimensional grid. The memory cells are formed onto a silicon wafer in an array of columns and rows. The memory cells are joined by wordlines, which are conducting lines electrically connected to the control gates of the memory cells, and bitlines, which are conducting lines electrically connected to the drain electrodes of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

Some memory devices can be three-dimensional (3D) memory devices (e.g., 3D NAND devices). For example, a 3D memory device can include memory cells that are placed between sets of layers including a pillar (e.g., polysilicon pillar), a tunnel oxide layer, a charge trap (CT) layer, and a dielectric (e.g. oxide) layer. A 3D memory device can have a "top deck" corresponding to a first side and a "bottom deck" corresponding to a second side. Without loss of generality, the first side can be a drain side and the second side can be a source side. For example, a 3D memory device can be a 3D replacement gate memory device having a replacement gate structure using wordline stacking.

A memory cell ("cell") can be programmed (written to) by applying a certain voltage to the cell, which results in an electric charge being held by the cell. For example, a voltage signal $V_{CG}$ that can be applied to a control electrode of the cell to open the cell to the flow of electric current across the cell, between a source electrode and a drain electrode. More specifically, for each individual cell (having a charge Q stored thereon) there can be a threshold control gate voltage Vt (also referred to as the "threshold voltage") such that the source-drain electric current is low for the control gate voltage ($V_{CG}$) being below the threshold voltage, $V_{CG}<Vt$. The current increases substantially once the control gate voltage has exceeded the threshold voltage, $V_{CG}>Vt$. Because the actual geometry of the electrodes and gates varies from cell to cell, the threshold voltages can be different even for cells implemented on the same die. The cells can, therefore, be characterized by a distribution P of the threshold voltages, $P(Q, V_T)=dW/dV_T$, where dW represents the probability that any given cell has its threshold voltage within the interval [Vt, Vt+dVt] when charge Q is placed on the cell.

One type of cell is a single level cell (SLC), which stores 1 bit per cell and defines 2 logical states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell (1 bit for upper page (UP) data and 1 bit for lower page (LP) data) and defines 4 states ("11" or "L0", "10" or "L1", "01" or "L2" and "00" or "L3") each corresponding to a respective $V_T$ level. For example, the "11" state can be an erased state and the "01", "10" and "00" states can each be a respective programmed state. Another type of cell is a triple level cell (TLC), which stores 3 bits per cell (1 bit for UP data, 1 bit for LP data and 1 bit for extra page (XP) data) and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell (1 bit for UP data, 1 bit for LP data, 1 bit for XP data, and 1 bit for top page (TP) data) and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. Thus, an n-level cell can use $2^n$ levels of charge to store n bits of information for n pages. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of cells.

A memory device can exhibit threshold voltage distributions $P(Q, V_T)$ that are narrow compared with the working range of control voltages tolerated by the cells of the device. Accordingly, multiple non-overlapping distributions $P(Q_k, Vt)$ ("valleys") can be fit into the working range allowing for storage and reliable detection of multiple values of the charge $Q_k$, k=1, 2, 3 . . . . The distributions (valleys) are interspersed with voltage intervals ("valley margins") where none (or very few) of the cells of the device have their threshold voltages. Such valley margins can, therefore, be used to separate various charge states $Q_k$—the logical state of the cell can be determined by detecting, during a read operation, between which two valley margins the respective threshold voltage $V_T$ of the cell resides. Specifically, the read operation can be performed by comparing the measured threshold voltage $V_T$ exhibited by the memory cell to one or more reference voltage levels corresponding to known valley margins (e.g., centers of the margins) of the memory device.

A valley margin can also be referred to as a read window. For example, in a SLC cell, there is 1 read window that exists with respect to the 2 Vt distributions. As another example, in an MLC cell, there are 3 read windows that exist with respect to the 4 Vt distributions. As yet another example, in a TLC cell, there are 7 read windows that exist with respect to the 8 Vt distributions. Read window size generally decreases as the number of states increases. For example, the 1 read window for the SLC cell may be larger than each of the 3 read windows for the MLC cell, and each of the 3 read windows for the MLC cell may be larger than each of the 7 read windows for the TLC cell, etc. Read window budget (RWB) refers to the cumulative value of the read windows.

One or more memory access operations can be performed with respect to the memory cells of the memory device. In an illustrative example, a memory cell programming operation, which can be performed in response to receiving a program or write command from the host, can involve sequentially applying programming voltage pulses to a selected or target wordline (WLn). In some implementations, the programming pulse voltage can be sequentially ramped up from the initial voltage value (e.g., 0V) to the final voltage value (e.g., $V_{MAX}$). The unselected wordlines can, during the programming operation, be biased at a certain voltage, e.g., a pass voltage, which is less than the programming voltage. After each programming pulse, or after a number of programming pulses, a program verify operation can be performed to determine if the threshold voltage of the one or more memory cells has increased to a desired programming level.

Cells of a memory array that are selected for execution of a memory access operation (e.g., a read operation, a program operation, an erase operation) can be referred to target cells connected to a target wordline. The target cells can neighbor adjacent cells connected to at least one wordline neighboring the target wordline ("adjacent wordline"). For example, the at least one adjacent wordline can be a single wordline neighboring the target wordline or a pair of wordlines neighboring the target wordline. Illustratively, the target wordline can be referred to as an n-th wordline (WLn), and the at least one adjacent wordline can include at least one of adjacent wordline n−1 (WLn−1) or adjacent wordline n+1 (WLn+1). For example, in a 3D memory device, the set of adjacent wordlines can include a wordline located directly above the target wordline and/or a wordline located directly below the target wordline.

Each target cell has a respective group of adjacent cells. Each group of adjacent cells includes at least one cell that neighbors its respective target cell (e.g., one cell connected to WLn−1 and/or one cell connected to WLn+1). More specifically, each target cell can be connected to the same bitline as each cell of the respective group of adjacent cells, such that the target cell and the cells of the respective group of adjacent cells are within the same string. Accordingly, each group of adjacent cells can include a single adjacent cell, or a pair of adjacent cells connected to a same bitline as a respective target cell.

A cell (e.g., NAND cell) of a block can store data in the form of the threshold voltage, which is a lowest voltage at which the cell can be activated (i.e., switched on). During a read operation of a cell (i.e. a "read cell"), a read reference voltage ($V_{ref}$) can be applied to an associated wordline, and a sense amplifier connected to an associated bitline can be used to sense whether the read cell has been switched on. More specifically, if $V_{ref}$ is higher than a threshold voltage (Vt) of the read cell, then the read cell is turned on. It is noted that only one cell per bitline can be read at a time. Since the cells of a bitline are connected in series, all transistors for cells of the bitline that are not being read ("unread cells") need to be kept on during the read operation in order for the read output of the read cell to pass through to the sense amplifier. To achieve this, a pass through voltage (Vpass) can be applied to the wordlines of the unread cells to keep the unread cells on. More specifically, Vpass is a voltage that is chosen to be higher than all of the Vt's of the unread cells, but lower than a programming voltage, to ensure a memory cell is switched on. Although Vpass is a lower voltage than the programming voltage, the application of Vpass can affect (e.g., increase) the threshold voltage and thus alter logic states of the unread cells of the block via tunneling currents. This phenomenon is referred to as "read disturb." As more read operations are applied within the block, the accumulation of read disturb over time can lead to read disturb errors.

Cell-to-cell interference (also referred to as "C2C interference") may exist in a memory array between the target cells and their respective groups of adjacent cells. Cell-to-cell interference can lead to lateral charge migration and Vt distribution shift. Cell-to-cell interference, in addition to intrinsic charge loss, can further lead to a widening of $V_T$ distributions. The $V_T$ distribution widening can cause RWB degradation, which can negatively affect memory device reliability. For example, RWB degradation can lead to an increase in the number of errors (e.g., bit errors) and/or error rate (e.g., bit error rate (BER)).

Cell-to-cell interference and lateral charge migration can result in the loss of RWB in view of the Vt difference between cells on a target wordline (WLn) and neighboring wordlines (e.g., WLn−1 and WLn+1). Specifically, cell-to-cell interference can cause the threshold voltage of the target wordline to shift up, with a larger shift occurring as the threshold voltage of WLn+1 increases. In addition, lateral charge migration can cause memory cells of target wordlines having a high threshold voltage to exhibit a higher charge loss when the neighboring memory cells have a low threshold voltage. Furthermore, lateral charge migration can cause higher charge gain for memory cells of a target wordline having a low threshold voltage if the neighboring memory cells have a high threshold voltage.

One mechanism to compensate for the effects of cell-to-cell interference and/or intrinsic charge loss is corrective read. Generally, a corrective read operation is performed to read each target cell using an appropriate read level offset that accounts for the cell-to-cell inference, lateral charge migration and/or intrinsic charge loss caused by the respective group of adjacent cells. The read level offset can be applied with respect to a center read level. For example, the center read level can be located within a valley between target cell $V_T$ distributions.

Another approach to compensate for threshold voltage shifting due to cell-to-cell interference and reduce data retention loss due to lateral charge migration (also referred to as "lateral data retention loss") is corrective program verify. To determine whether the target memory cell has been programmed to the desired state, a program verify operation is performed. In a program verify operation, a read voltage is applied to the target wordline connected to the control gate of the selected memory cell. In addition, a program verify pass through voltage is applied to the wordlines connected to the control gates of the unselected memory cells, so that the unselected wordlines pass current in a manner that is unrestricted by their stored data values. Current then flows from the source line to the column bit line through each NAND string via the corresponding select gates, restricted only by the selected memory cells of each string. This places the current-encoded data values of the row of selected memory cells on the column bit lines.

During the corrective program verify operation, the program verify (PV) pass through voltage is applied to neighboring wordlines (e.g., WLn−1 and WLn+1) while the read voltage is applied to read the target wordline (WLn) to verify the programming state (e.g., whether the target wordline has reached the target programming level). In these corrective program verify operations, the PV pass through voltage applied to the neighboring wordlines is the same as a pass through voltage applied to WLn−1 and WLn+1 during a read operation (Vpass(read)) corresponding to the associated programming level. For example, during a corrective program verify operation, the PV pass through voltage applied to the unselected wordlines is equal to the pass through voltage applied to the unselected wordlines during a read operation of the target wordline. However, applying a PV pass through voltage (Vpass(pv)) to the unselected wordlines that is the same as the pass through voltage applied during a read operation (Vpass(read)) fails to adequately suppress data retention loss caused by cell-to-cell interference and lateral charge migration, particularly due to a higher threshold voltage sensitivity of the target wordline due to the PV pass through voltage for adjacent wordlines having a high threshold voltage level.

Furthermore, these corrective program verify operations perform multiple program verify sub-operations) (e.g., a high program verify and a low program verify) for each level. The two-level program verify approach used in the corrective program verify causes an increase to the total programming time (Tprog). Accordingly, these corrective program verify approaches require the consumption of additional circuitry area due to corresponding design complexities.

Aspects of the present disclosure address the above and other deficiencies by performing corrective program verify operations with improved read window budget retention, without the penalty of additional programming time and circuitry area consumption. Embodiments described herein can execute a corrective program verify operation to verify whether a target wordline (WLn) is programmed to a target programming level (e.g., L1, L2 . . . L15 for a QLC memory device). The program verify operation includes application of a program verify voltage level (Vpv) corresponding to a target programming level to the target wordline (WLn) to verify if programming at the target level is complete. During the read sub-operation, a program verify (PV) pass through voltage (herein referred to as the "PV pass voltage" or "Vpass(pv)") is applied to the immediately adjacent or neighboring wordlines (WLn−1 and WLn+1) that has a voltage that is less than a pass through voltage applied to the neighboring wordlines in a read operation (Vpass(read)). In an embodiment, the Vpass(read) level corresponding to a read operation of the target wordline is determined. In an embodiment, the Vpass(read) level can be determined via a look-up of a stored or predetermined value corresponding to a read operation of the target programming level.

According to embodiments, the Vpass(pv) applied to WLn−1 and WLn+1 during the program verify operation is set to a voltage level equal to the Vpass(read) reduced by an offset voltage amount (herein referred to as the "PV offset"). Accordingly, a program verify voltage corresponding to the target voltage level (Vpv) is applied to the target wordline (WLn) and a PV pass voltage (Vpass(pv)) is applied to a first adjacent wordline (WLn−1) and a second adjacent wordline (WLn+1), where the Vpass(pv) equals the Vpass(read) adjusted or reduced by the PV offset, such that Vpass(pv)=Vpass(read)−PV offset). Advantageously, application of a lower Vpass(pv) (relative to the Vpass(read)) to the one or more immediately adjacent wordlines during the program verify operation, the threshold voltage placement of the target wordline (WLn) is shifted down to a larger degree for an adjacent wordline having a high threshold voltage than an adjacent wordline having a low threshold voltage.

In an embodiment, a scaled PV offset can be used to determine the Vpass(pv). In this embodiment, the PV offset can incrementally increase as the corresponding target programming level of the target wordline increases. Accordingly, the PV offset increases as a function of the programming level (e.g., PV offset 1 for L1<PV offset 2 for L2<PV offset 3 for L3, and so on). For example, the Vpass(pv) applied to WLn−1 and WLn+1 can be determined based on a first PV offset (e.g., PV offset 1) when the target wordline (WLn) is programmed to a first programming level (L1). A first PV offset (e.g., PV offset 1) can be used to determine Vpass(pv) (where Vpass(pv)=Vpass(read)−PV offset) applied to the one or more immediately neighboring wordlines (WLn−1, WLn+1) during a program verify operation when the target wordline is programmed to a first programming level (L1), a second PV offset (e.g., PV offset 2) can be used to determine Vpass(pv) applied to the one or more immediately neighboring wordlines during a program verify operation when the target wordline is programmed to a second programming level (L2), and so on, where PV offset 1<PV offset 2.

In an embodiment, the PV offset is determined based on a loss level (e.g., a C2C interference/lateral charge migration retention loss levels) associated with a wordline group including the target wordline. In this embodiment, each wordline is associated with a wordline group (e.g., a group of 8 wordlines, a group of 16 wordlines, etc.). A data structure is maintained that stores a loss level (e.g., a C2C interference/lateral charge migration retention loss level) corresponding to each wordline group. For example, a first wordline group may be associated with a high loss level (e.g., a high C2C interference/lateral charge migration retention loss) and a second wordline group may be associated a low loss level (e.g., a low C2C interference/lateral charge migration retention loss). In an embodiment, wordline groups associated with a low loss level correspond to a first PV offset and wordline groups associated with a high loss level correspond to a second PV offset, where the first PV offset (PV offset 1) is less than the second PV offset (PV offset 2). Accordingly, during a program verify operation, a wordline group of the target wordline is identified and the corresponding loss level (e.g., a low loss level or a high loss level) is determined. If the target wordline is part of a wordline group associated with a low loss level, the Vpass (pv) applied to the one or more immediately adjacent wordlines is determined based on a first PV offset (e.g., Vpass(pv)=Vpass(read)−PV offset 1). If the target wordline is part of a wordline group associated with a high loss level, the Vpass(pv) applied to the one or more immediately adjacent wordlines is determined based on a second PV offset (e.g., Vpass(pv)=Vpass(read)−PV offset 2). Advantageously, the setting of the PV pass voltage dependent on a corresponding loss level enables the use of a PV offset that is optimized per wordline group, where the PV offset is larger for those wordline groups having worse loss levels (e.g., higher C2C interference/lateral charge migration retention loss levels) and is smaller for those wordline groups having better loss levels (e.g., lower C2C interference/lateral charge migration retention loss levels).

In an embodiment, during a program verify operation associated with a target wordline (WLn), a first PV offset can be applied to a preceding neighbor wordline (WLn−1) and a second PV offset can be to a subsequent neighbor wordline (WLn+1). In this embodiment, the first PV offset used to determine the Vpass(pv) applied to WLn−1 during the program verify operation is less than the second PV offset used to determine the Vpass(pv) applied to WLn+1 during the program verify operation. Accordingly, the Vpass(pv) applied to WLn+1 is lower than the Vpass(pv) applied to WLn−1 to account for a larger C2C aggression from the WLn+1 side.

According to embodiments, applying adaptive Vpass(pv) levels based on a PV offset between the Vpass(pv) and the Vpass(read) to one or more immediately adjacent wordlines (WLn−1, WLn+1) during execution of a corrective program verify operation associated with programming a target wordline (WLn) can be used to shift threshold voltage placement of different neighbors. Applying pass through voltage levels (Vpass(pv)) to the neighboring wordlines that are lower than (i.e., reduced by PV offset) the corresponding pass through read voltage (Vpass(read)) during the corrective program verify operation results in the shifting down of the threshold voltage of high threshold voltage neighbors to a larger degree than lower threshold voltage neighbors. Further details performing corrective program verify operations using a PV offset to establish a PV pass voltage (Vpass(pv)) applied to neighboring wordlines are described herein below with reference to FIGS. 1-9.

Advantages of the present disclosure include, but are not limited to, a reduction in read window budget and data retention loss in a memory device. Furthermore, the corrective program verify operation in accordance with the present disclosure can be executed without programming time penalty and circuit area consumption, as compared to other corrective approaches. Moreover, the improved corrective program verify operation effectiveness can lead to improved RWB.

For example, use of the PV offset to establish the Vpass (pv) level that is different from Vpass(read) in a corrective program verify operation limits read window budget loss due to C2C interference and retention loss due to lateral charge migration. For example, use of a PV offset in a range of approximately 0.6V to approximately 1.4V can result in a retention RWB gain of approximately 100 mV to 200 mV, as compared to application of a Vpass(pv) that is equal to Vpass(read) (e.g., use of a zero PV offset). In another example, use of the corrective program verify operation in a QLC memory device using a PV offset in a range of approximately 0.5V to approximately 1.1V results in an lateral charge migration retention gain in a range of approximately 200 mV to approximately 400 mV.

FIG. 1A illustrates an example computing system 100 that includes a memory sub-system 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory page buffers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The local media controller 135 can implement a corrective program verify (CPV) component 134 that can perform corrective program verify operations using a program verify voltage offset to establish a pass voltage applied to one or more adjacent wordlines during execution of a program verify operation on a target wordline (WLn) to improve read window budget and data retention loss. For example, the CPV component 134 an initiate a corrective program verify operation to verify programming of a set of target cells connected to a target wordline. For example, the CPV component 134 can initiate the corrective read operation in response to receiving a request (e.g., program command) via the memory sub-system controller 115 to program the set of target cells.

The CPV component 134 can set and apply a pass through voltage (Vpass(pv)) to the one or more neighboring wordlines (WLn−1, WLn+1) during application of a program verify voltage (Vpv) to the target wordline (WLn), where the Vpass(pv) is lower than a Vpass(read) by an offset amount (PV offset). In an embodiment, the CPV component 134 applies a Vpass(pv) to the neighboring wordlines during the corrective program verify operation based on a PV offset that is scaled as a function of the target threshold voltage of the target wordline (e.g., the PV offset incrementally increases as the target program level of the target wordline increases).

In an embodiment, the CPV component 134 applies a Vpass(pv) to the neighboring wordlines during the corrective program verify operation that is based on a loss level associated with a wordline group including the target wordline (e.g., the PV offset corresponding to target wordlines in wordline groups associated with a low loss level (low C2C interference and/or low lateral charge migration) is lower than the PV offset corresponding to target wordlines in wordline groups associated with a high loss level.

In an embodiment, the CPV component 134 applies a first Vpass(pv) based on a first PV offset relative to the Vpass (read) to a preceding neighbor wordline (WLn−1) and applies a second Vpass(pv) based on a second PV offset relative to the Vpass(read) to a subsequent neighbor wordline (WLn+1). In this embodiment, the first Vpass(pv) applied to WLn−1 is higher than the second Vpass(pv) applied to WLn+1 (i.e., the first PV offset is less than the second PV offset). The use of a greater PV offset relative to Vpass(read) counteracts the effects of the larger C2C aggression from WLn+1, as compared to the C2C aggression from WLn−1.

Figure 1B:
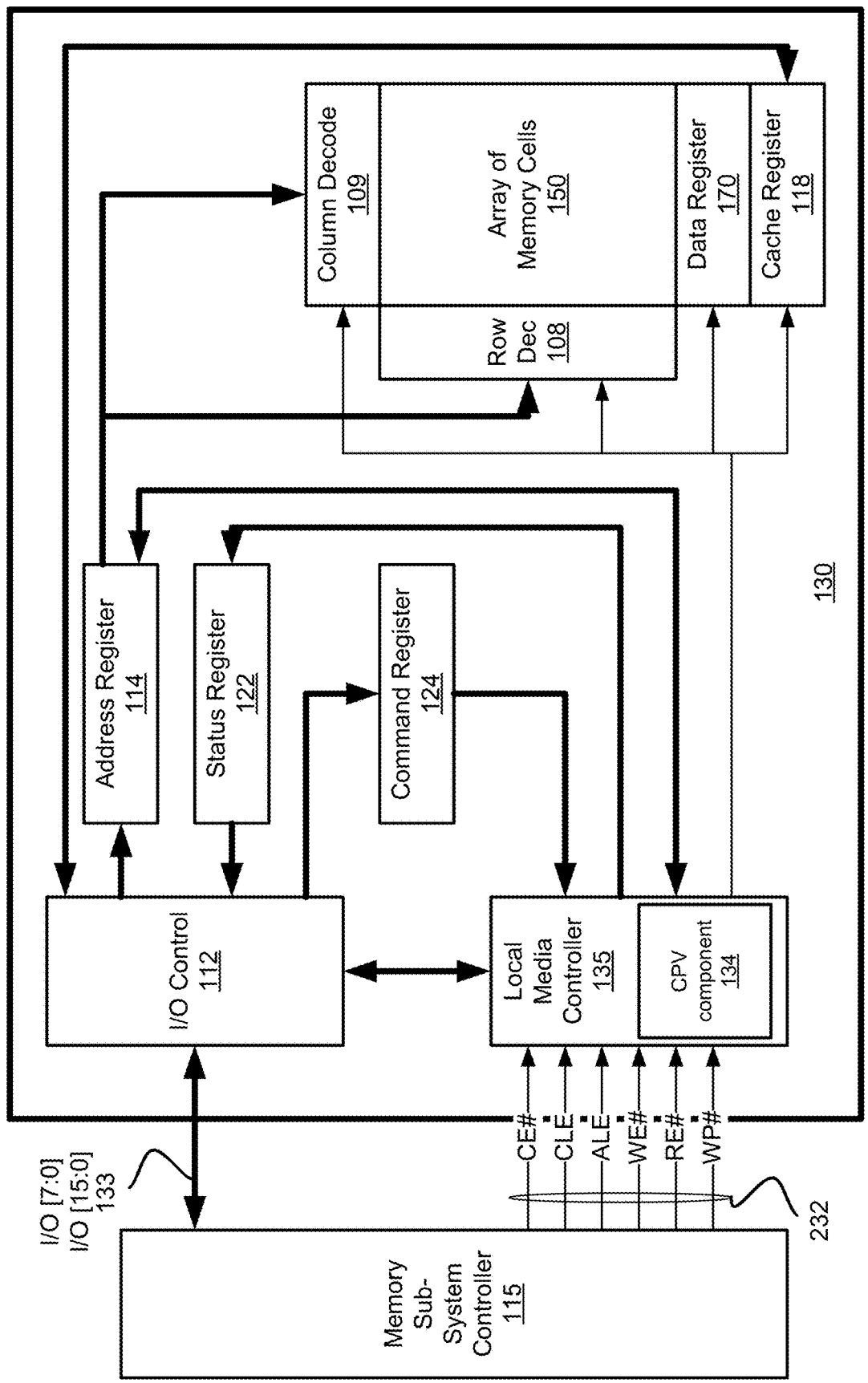
FIG. 1B is a block diagram of a memory device in communication with a memory sub-system controller of a memory sub-system, in accordance with one or more embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are connected to the same access line (e.g., a wordline) while memory cells of a logical column are selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses. In one embodiment, local media controller 135 includes the CPV component 134, which can implement the corrective program verify operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status page buffer 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
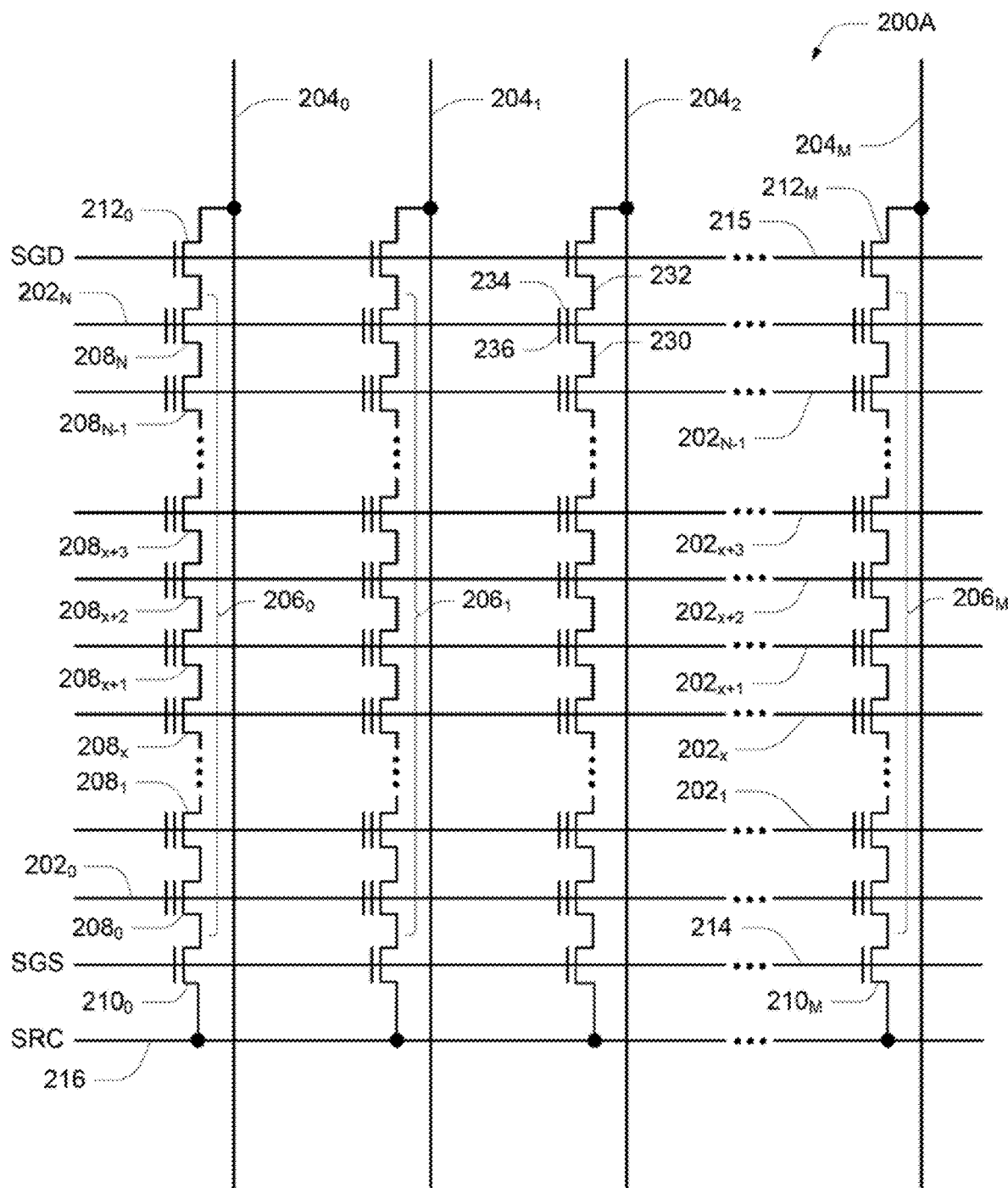
FIG. 2A-2C are schematics of portions of an array of memory cells as could be used in a memory of the type described with reference to FIG. 1B, in accordance with one or more embodiments of the present disclosure.
Figure 2B:
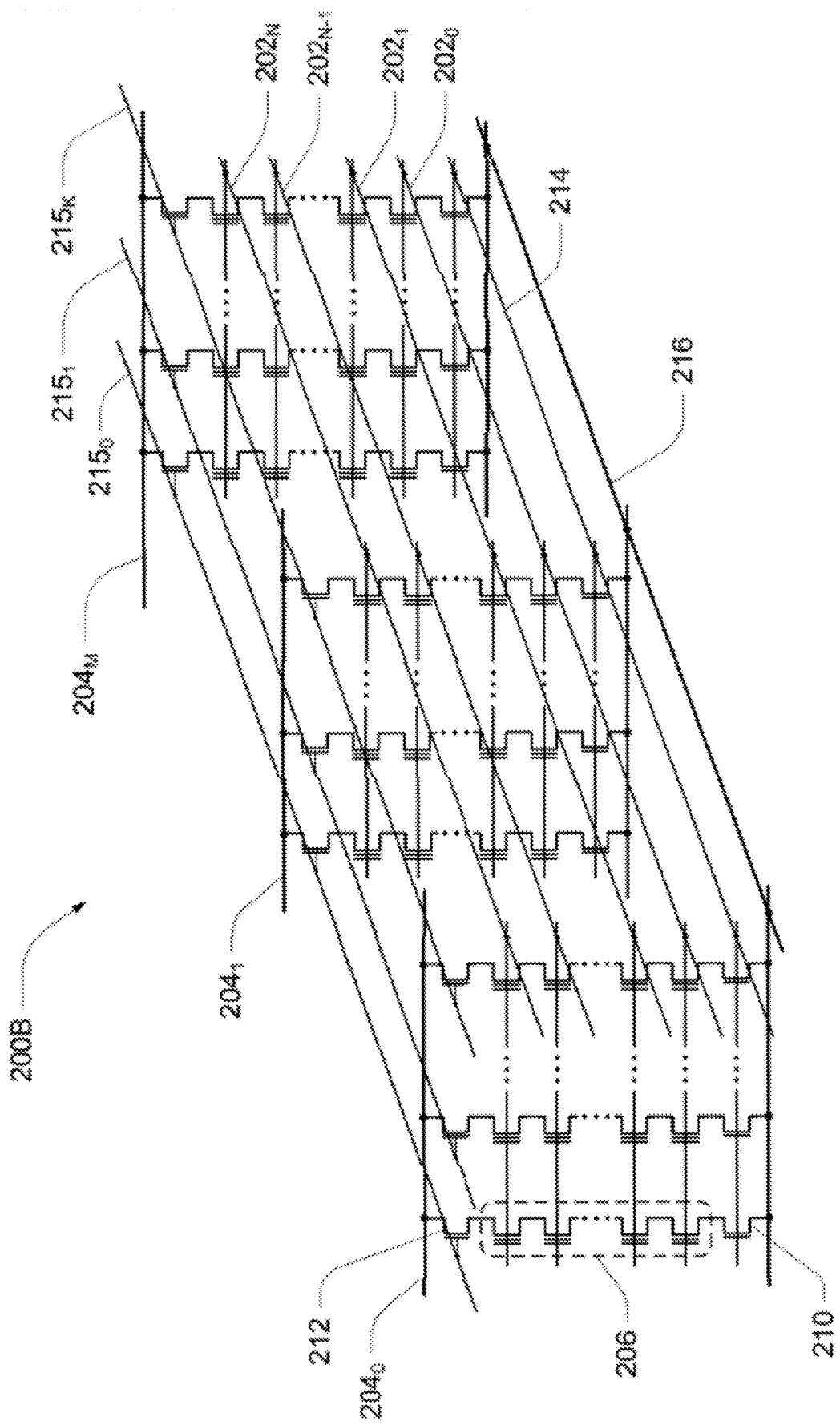
Figure 2C:
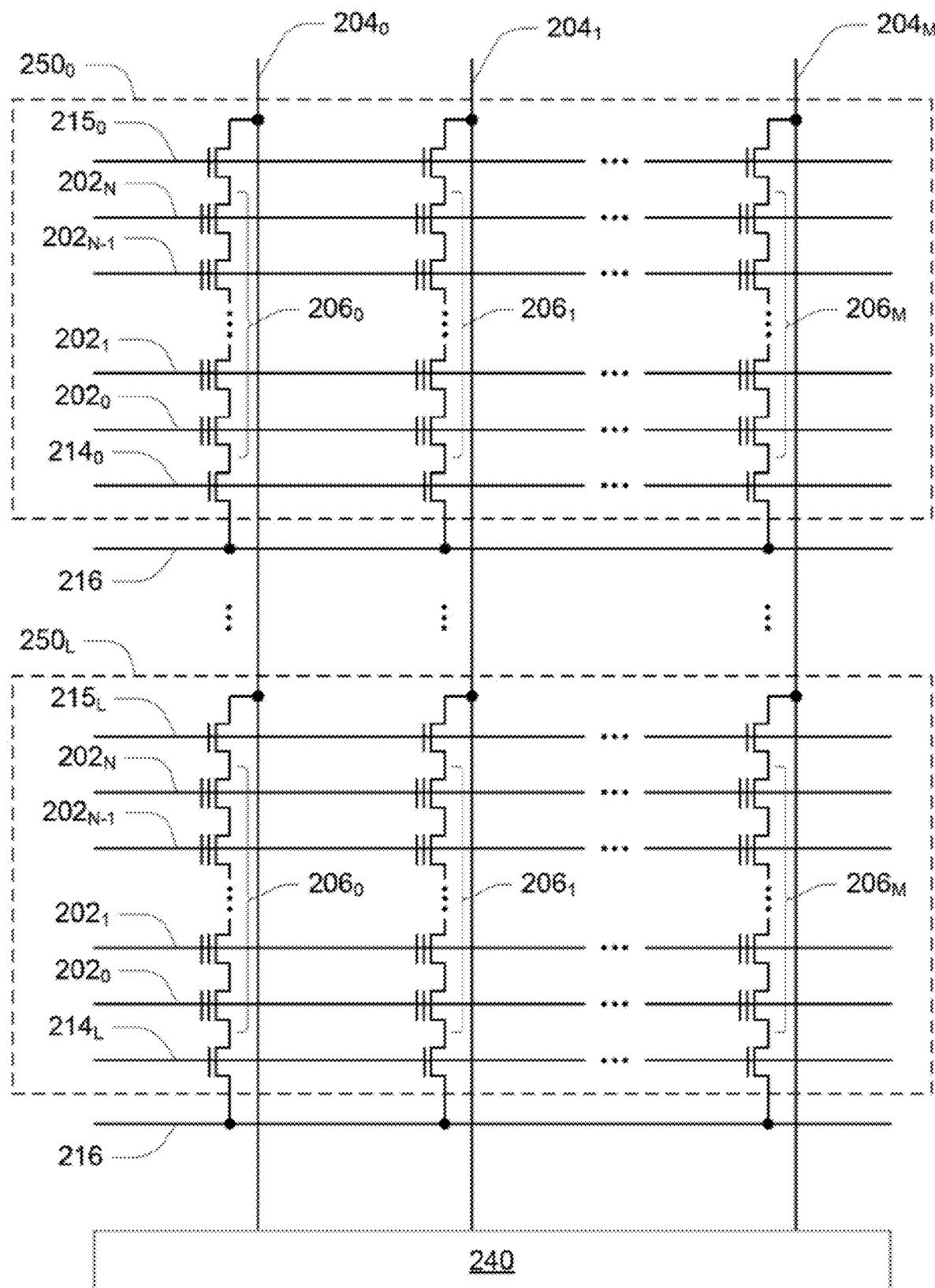

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines $215_0$-$215_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of an wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

Figure 3:
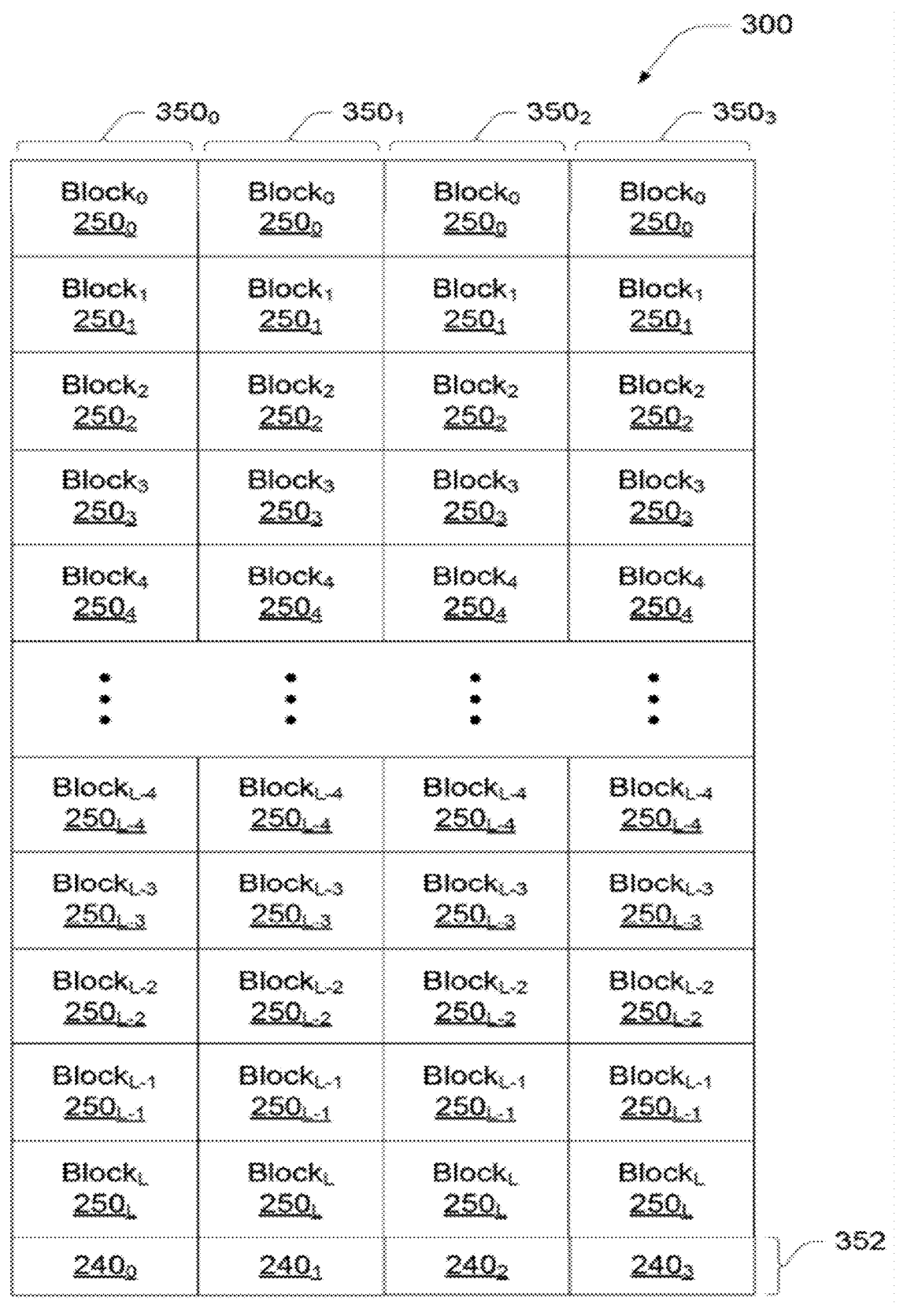

FIG. 3 is a block schematic of a portion of an array of memory cells 300 as could be used in a memory of the type described with reference to FIG. 1B. The array of memory cells 300 is depicted as having four memory planes 350 (e.g., memory planes $350_0$-$350_3$), each in communication with a respective buffer portion 240, which can collectively form a page buffer 352. While four memory planes 350 are depicted, other numbers of memory planes 350 can be commonly in communication with a page buffer 352. Each memory plane 350 is depicted to include L+1 blocks of memory cells 250 (e.g., blocks of memory cells $250_0$-$250_L$).

Figure 4A:
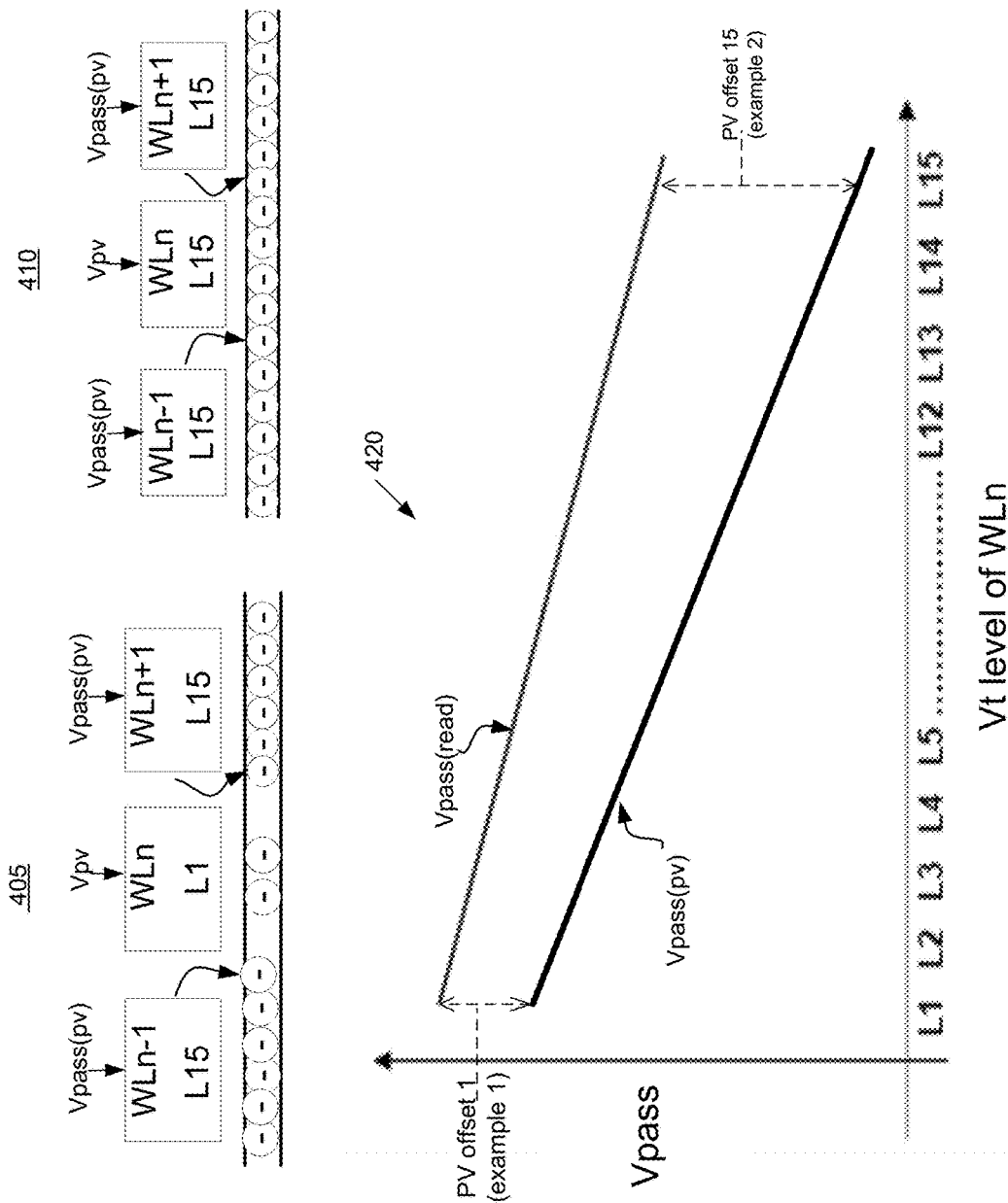
FIG. 4A illustrates example arrangements of a target wordline and adjacent wordlines during execution of a corrective program verify operation, in accordance with one or more embodiments of the present disclosure.

FIG. 4A illustrates example arrangements of a target wordline (WLn) and corresponding neighboring wordlines (WLn−1 and WLn+1) during execution of a corrective program verify operation, according to embodiments of the present disclosure. As shown in a first example 405, a program operation is executed to program a set of target cells associated with a selected or target wordline WLn to a first programming level (L1 of a QLC memory device). In a second example 410, a program operation including the corrective program verify operation is executed to program a set of target cells associated with a selected or target wordline WLn to a fifteen programming level (L15 of a QLC memory device).

As part of the respective program operations, a corrective program verify operation according to embodiments of the present disclosure is performed. The corrective program operation includes applying a program verify voltage (Vpv) to the target wordline to verify whether the target wordline has been programmed to the target programming level. In these examples, the first example 405 has a low threshold voltage. During the application of Vpv to WLn, a pass through voltage (Vpass(pv)) is applied to WLn−1 and WLn+1. In an embodiment, Vpass(pv) is determined in accordance with the following expression:

$$\text{Vpass}(pv) = \text{Vpass(read)} - PV \text{ offset;}$$

where Vpass(read) is the pass through voltage applied to WLn−1 and WLn+1 during a read operation corresponding to the target wordline, and where the PV offset is a scaled value determined based on the threshold voltage level associated with the programming of the target wordline (WLn).

Figure 4B:
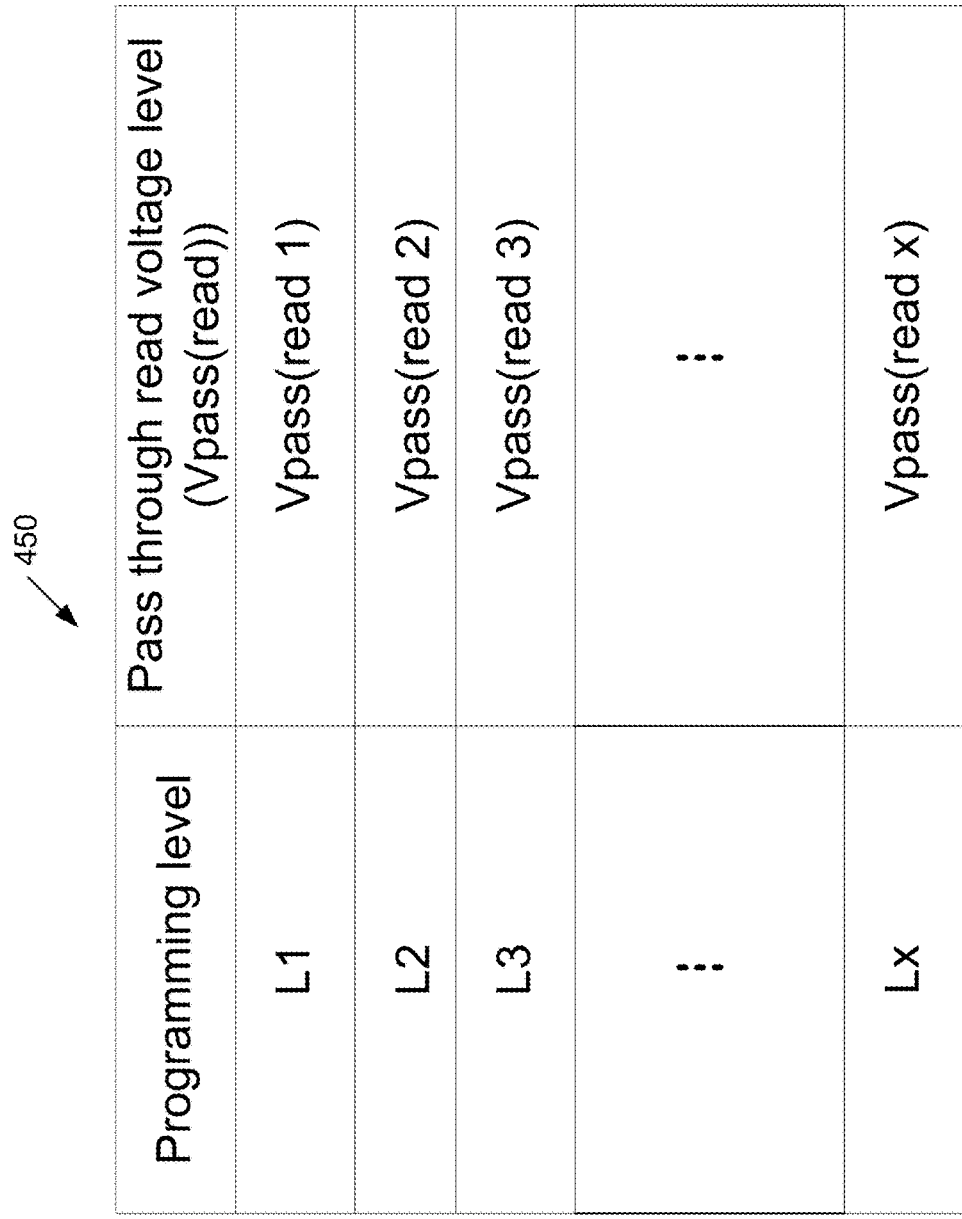
FIG. 4B illustrates an example data structure including a stored or preset pass through read voltage level (Vpass (read)) corresponding to a respective programming level, in accordance with one or more embodiments of the present disclosure.

FIG. 4B illustrates an example data structure 450 including a stored or preset pass through read voltage level (Vpass(read)) corresponding to a respective programming level (e.g., L1, L2, L3 . . . Lx; where x=15 for a QLC memory device). As illustrated, the data structure 450 can be used (e.g., via a look-up operation) to identify the pass through read voltage level (Vpass(read)) associated with the target programming level of the target wordline. The identified pass through voltage level (Vpass(read)) is used to determine the pass through voltage level (Vpass(pv)) applied during the corrective program verify operation.

With reference to FIG. 4A, as shown in the graph 420, the PV offset (e.g., the margin between the Vpass(read) and the Vpass(pv)) increases as the threshold voltage level of WLn increases. Accordingly, a first PV offset associated with L1 is less than a second PV offset associated with L2, the second PV offset is less than a third PV offset associated with L3, and so on. In accordance with graph 420, PV offset 1 is used to determine the Vpass(pv) applied to WLn−1 and WLn+1 in the first example 405, since the threshold voltage of WLn corresponding to L1 is relatively low (e.g., WLn has a low Vt). In accordance with the graph 420, PV offset 15 is used to determine the Vpass(pv) applied to WLn−1 and WLn+1 in the second example 410, since the threshold voltage of WLn corresponding to L15 is relatively high (e.g., WLn has a high Vt).

As shown in FIG. 4A, as the PV offset used to determine the Vpass(pv) increases as the threshold voltage level of the target wordline increases. Accordingly, the PV offset is larger for high Vt level read operations due to a stronger fringing field from the higher Vread applied to the WLn. As a result, high Vt cells (e.g., cells of L15 shown in the second example 410) have a weaker Vt sensitivity to the Vpass(pv) applied to the neighboring wordlines WLn−1 and WLn+1. Accordingly, the PV offset between the Vpass(pv) and the Vpass(read) increases with the threshold voltage levels of the target cells of the target wordline WLn.

Figure 5:
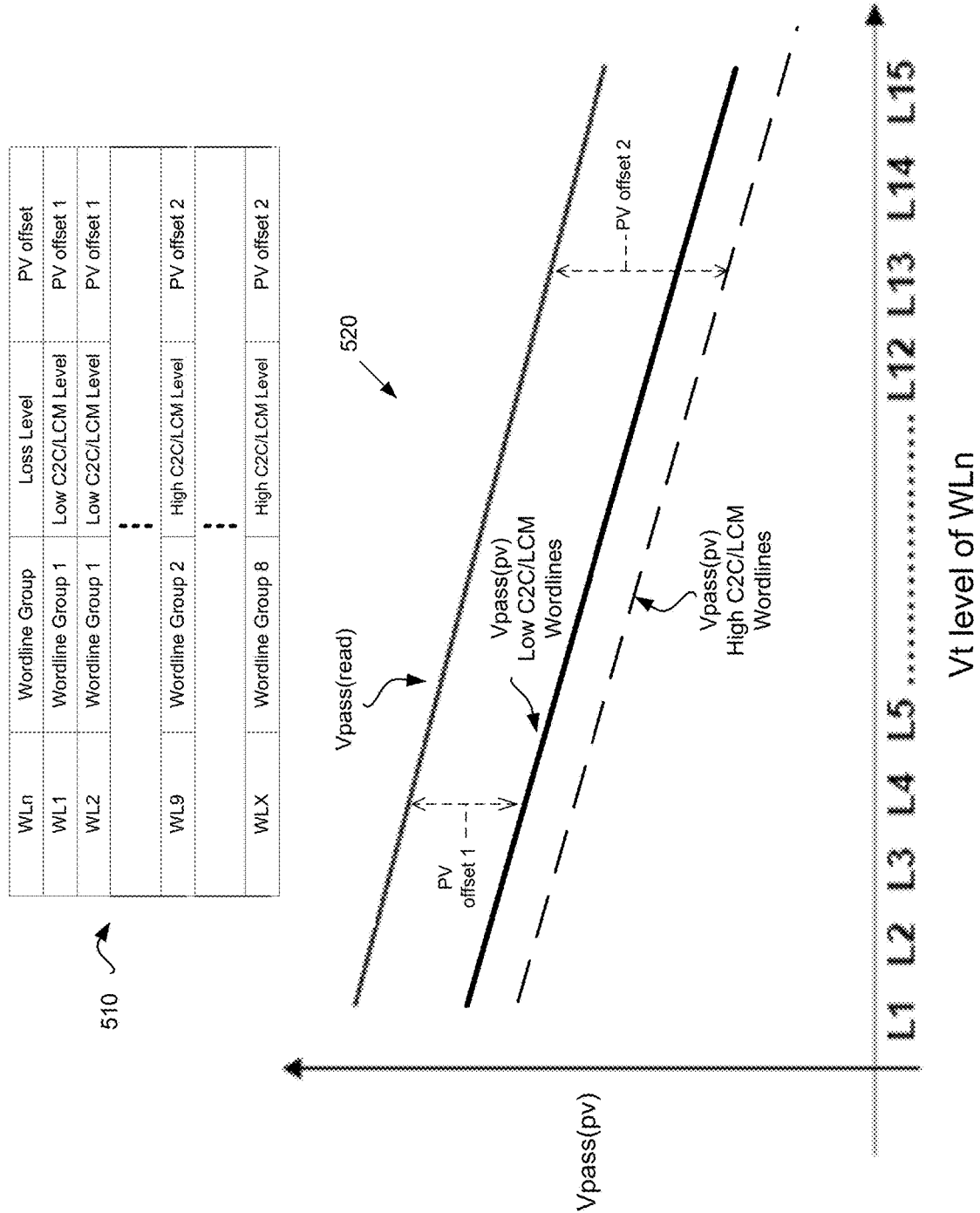
FIG. 5 illustrates a data structure and graph associated with a corrective program verify operation including an offset value determined based on a loss level associated with a target wordline subject to a program operation, in accordance with one or more embodiments of the present disclosure.

FIG. 5 illustrates a data structure 510 and graph 520 associated with an embodiment of the corrective program verify operation based on a loss level (e.g., a C2C interference level and/or a lateral charge migration level (LCM)) associated with a target wordline subject to a program operation, in accordance with an embodiment of the present disclosure. As shown in FIG. 5, the data structure 510 includes information identifying each wordline (e.g., WL1, WL2, . . . WL9, . . . WLX), a corresponding wordline group (e.g., wordline group 1, wordline group 2, . . . wordline group 8), a loss level (e.g., a low C2C, a low LCM, or both) corresponding to each wordline group, and a PV offset corresponding to each loss level (e.g., PV offset 1 for a wordline group having a low loss level and PV offset 2 for a wordline group having a high loss level). As shown in the graph 520, PV offset 1 (low loss level) is smaller than PV offset 2 (high loss level). Accordingly, as shown in the graph 520, the Vpass(pv) applied to the neighboring wordlines for a target wordline having a low loss level is higher than the Vpass(pv) applied to the neighboring wordlines for a target wordline having a high loss level.

As shown in the graph 520, the Vpass(pv) applied to the neighboring wordlines (WLn−1 and WLn+1) of the target wordline during the program verify operation is determined based on the PV offset corresponding to the loss level for the wordline group of the target wordline. For example, for execution of the corrective program verify operation on target wordline WL2, the data structure 510 is used to identify the corresponding wordline group. Having identified that WL2 is in wordline group 1, the loss level (e.g., a high loss level or a low loss level) associated with wordline group 1 is determined. As shown in data structure 510, wordline group 1 is associated with a low loss level. As shown in the graph 520, a low loss level target wordline corresponds to PV offset 1.

According to embodiments, the loss level (e.g., C2C interference and lateral data retention loss due to lateral charge migration) can have a large wordline group variation. For example, some memory devices may include a particular wordline group (e.g., wordline group 2, wordline group X, etc.) that exhibits higher loss levels than other wordline groups (e.g., wordline group 1). In view of the wordline group dependence of the loss level, the PV offset between the Vpass(pv) and the Vpass(read) is established per WL group. In an embodiment, as shown in FIG. 5, the PV offset is larger for those wordline groups exhibiting higher loss levels (e.g., higher C2C/LCM wordlines) and the PV offset is smaller for those wordline groups exhibiting lower loss levels (e.g., lower C2C/LCM wordlines).

Figure 6:
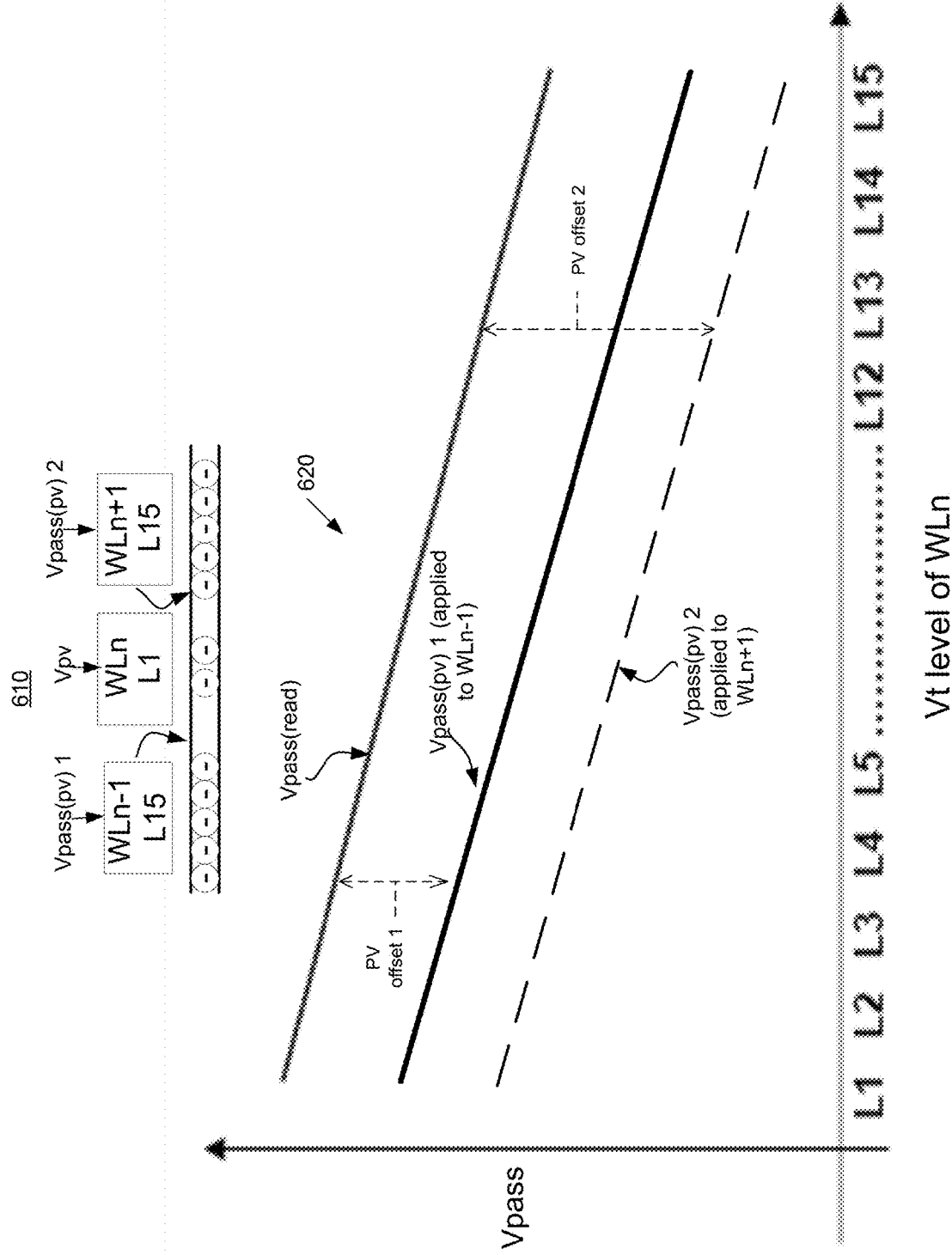
FIG. 6 illustrates an example corrective program verify operation including a first offset value applied to a first adjacent wordline associated with a target wordline and a second offset value applied to a second adjacent wordline associated with the target wordline, in accordance with one or more embodiments of the present disclosure.

FIG. 6 illustrates an example arrangement of a target wordline (WLn) and corresponding neighboring wordlines (WLn−1 and WLn+1) during execution of a corrective program verify operation, according to embodiments of the present disclosure. As shown in the example arrangement 610, a program operation is executed to program a set of target cells associated with a selected or target wordline WLn to a first programming level (L1 of a QLC memory device), with both a preceding wordline WLn−1 and a subsequent wordline WLn+1 programmed to a high programming level (L15 of a QLC memory device) having a high threshold voltage level. In an embodiment, during the corrective program verify operation, a program verify voltage (Vpv) is applied to the target wordline to determine if the target cells of the target wordline have been programmed to the target level (L1). In this embodiment, a first pass through voltage (Vpass(pv) 1) is applied to the immediately preceding neighbor wordline (WLn−1) and a second pass through voltage (Vpass(pv) 2) is applied to the immediately subsequent neighbor wordline (WLn+1), where the first Vpass (pv) is greater than the second Vpass(pv).

As illustrated in the graph 620, the Vpass(pv) 1 applied to WLn−1 and the Vpass(pv) 2 applied to WLn+1 are determined based on the following expressions:

$$\text{Vpass}(pv)1 = \text{Vpass(read)} - PV \text{ offset 1;}$$

$$\text{Vpass}(pv)2 = \text{Vpass(read)} - PV \text{ offset 2;}$$

where Vpass(read) is a pass through voltage level applied to WLn−1 and WLn+1 during a read operation of the target wordline, and where PV offset 1 is less than PV offset 2.

In this embodiment, since C2C aggression occurs at a higher rate from the WLn+1 side, a higher PV offset (e.g., PV offset 2) between Vpass(pv) 2 and Vpass(read) is used. Accordingly, in this embodiment, during the corrective program verify operation, a first pass through voltage (Vpass (pv) 1) is applied to WLn−1 and a second pass through voltage (Vpass(pv) 2) is applied to WLn+1, where Vpass (pv) 2 is based on a higher offset value (PV offset 2) as compared to the offset value (PV offset 2) used to establish Vpass(pv) 1 that is applied to WLn−1.

Figure 7:
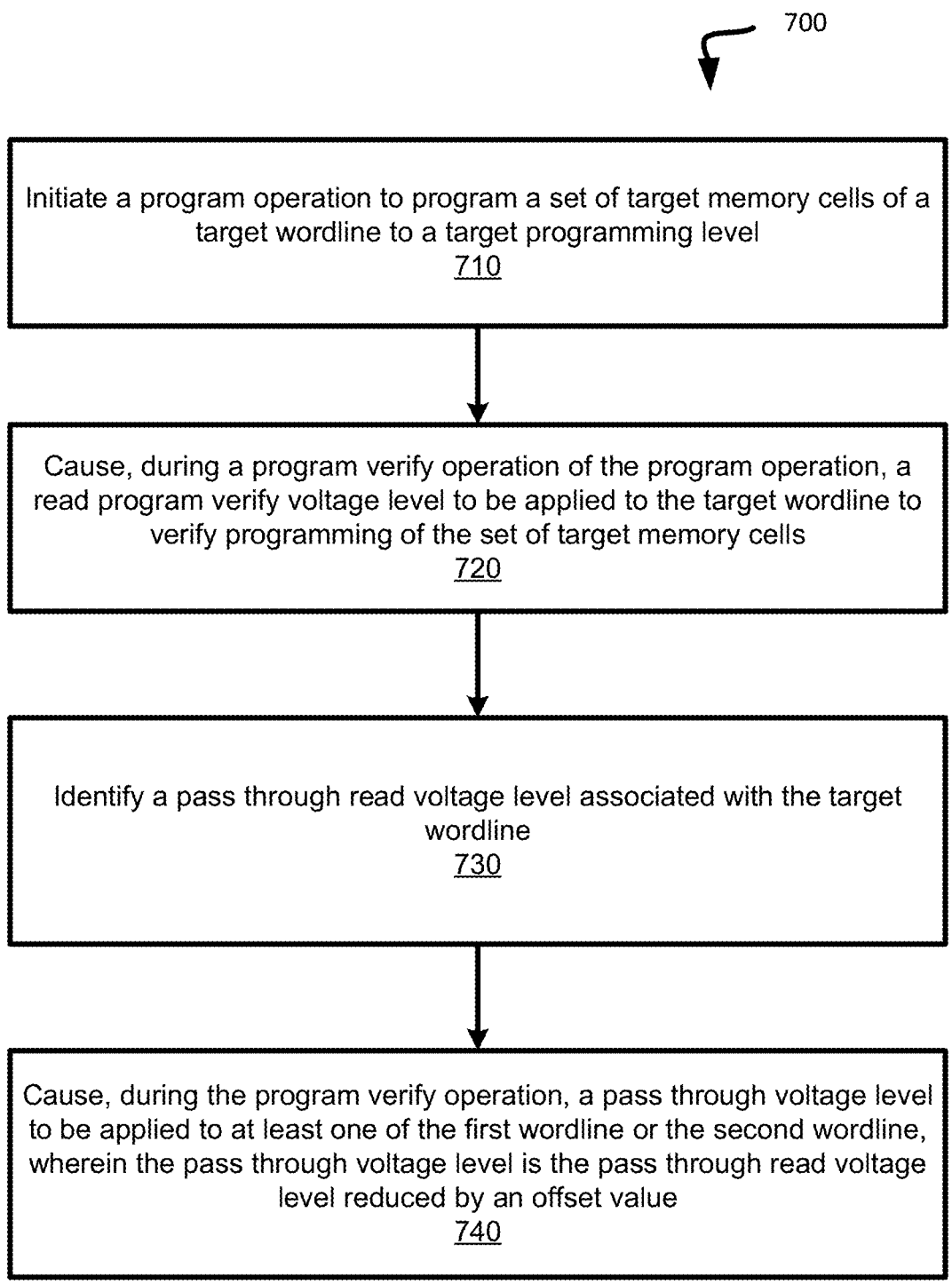
FIG. 7 is a flow diagram of an example method to perform a corrective program verify operation with improved read window budget retention, in accordance with one or more embodiments of the present disclosure.

FIG. 7 is a flow diagram of an example method 700 to perform a corrective program verify operation with improved read window budget retention, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the CPV component 134 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, a program operation is initiated with respect to a set of target memory cells. For example, processing logic (e.g., CPV component of FIGS. 1A-1B) can cause the program operation to be initiated to program the set of target memory cells of a target wordline (WLn) to a target programming level (e.g., L1, L2, L3 . . . or L15 of a QLC memory device). The request can be a program command received via a memory sub-system controller (e.g., the memory sub-system controller 115 of FIGS. 1A-1B). Each target memory cell of the set of target memory cells is connected to the target wordline.

At operation 720, a program verify operation is performed. For example, the processing logic can cause, during a corrective program verify operation of the program operation, a read voltage level (Vread) to be applied to the target wordline to verify programming of the set of target memory cells.

At operation 730, a voltage level is identified. For example, the processing logic can identify a pass through read voltage level associated with the target wordline. In an embodiment, the pass through read voltage level (Vpass (read)) is the pass through voltage applied to the neighboring wordlines (WLn−1 and WLn+1) during a read operation associated with the target wordline. In an embodiment, the pass through read voltage level (Vpass(read) can be identified by performing a look-up operation of a data structure storing the preset Vpass(read) level.

At operation 740, a pass through voltage is applied. For example, the processing logic can cause, during the program verify operation, a pass through voltage level to be applied to at least one of the first wordline or the second wordline, where the pass through voltage level is the pass through read voltage level reduced by an offset value. According to embodiments, the pass through voltage level (Vpass(pv)) applied during the corrective program verify operation is equal to the pass through read voltage level (Vpass(read)) reduced by the offset value (PV offset).

In an embodiment, the offset value is determined based on the target programming level of the target wordline (WLn). In this embodiment, the offset value is scaled (e.g., incrementally increases) as the threshold voltage associated with the target programming level of the target wordline increases (e.g., as shown in graph 420 of FIG. 4). In an embodiment, the pass through voltage level is applied to both the first wordline (WLn−1) and the second wordline (WLn+1) using the identified offset value corresponding to the target programming level.

In an embodiment, the processing logic determines the offset value based on a loss level associated with a wordline group comprising the target wordline. In this embodiment, the loss level can represent one or more of the C2C interference level or the lateral charge migration (LCM) level. According to this embodiment, a wordline group of the target wordline is identified. In an embodiment, using a data structure (e.g., data structure 510 of FIG. 5), the processing logic identifies the loss level associated with the wordline group. In an embodiment, if the loss level associated with the wordline group is a low loss level, the offset value is set to a first PV offset (PV offset 1). In an embodiment, if the loss level associated with the wordline group is a high loss level, the offset value is set to a second PV offset (PV offset 2). According to embodiments, PV offset 1 is less than PV offset 2. In an embodiment, the loss level can be categorized as either a low loss level or a high loss level based on a comparison with a threshold loss level (e.g., a low loss level is less than the threshold loss level and a high loss level is greater than or equal to the threshold loss level).

In an embodiment, a first pass through voltage level is applied to the first wordline (WLn−1) and a second pass through voltage is applied to the second wordline (WLn+1). In this embodiment, the first pass through voltage level is determined based on a first offset value (PV offset 1) and the second pass through voltage level is based on a second offset value (PV offset 2). In this embodiment, the second offset value used for the subsequent adjacent wordline (WLn+1) is greater than the first offset value used for the preceding adjacent wordline (WLn−1).

Figure 8:
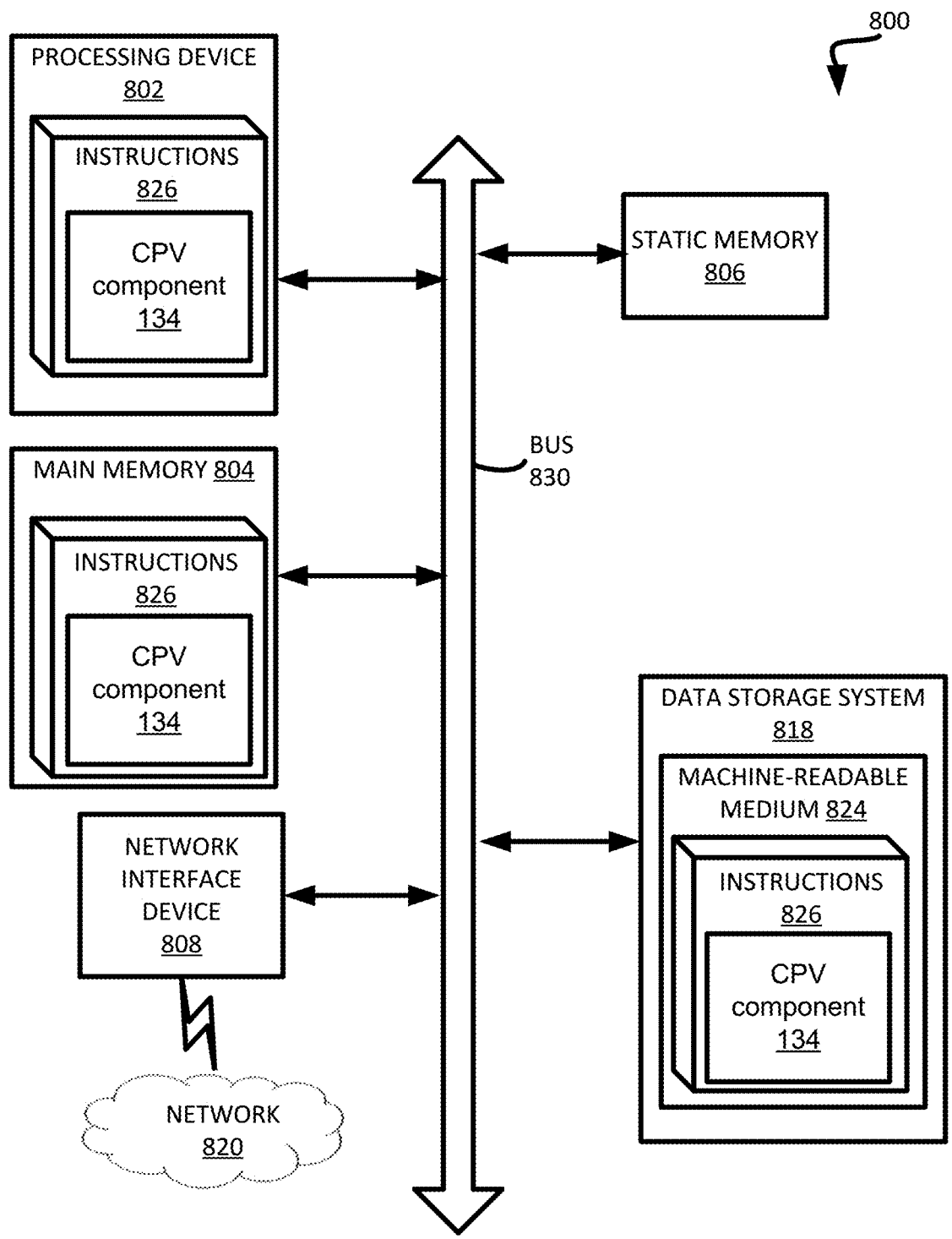
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the CPV component 134 of FIG. 1A and FIG. 1B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 602 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1A.

In one embodiment, the instructions 826 include instructions to implement functionality corresponding to a CR component (e.g., the CPV component 134 of FIG. 1A and FIG. 1B). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's page buffers and memories into other data similarly represented as physical quantities within the computer system memories or page buffers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A memory device comprising:
a memory array comprising:
 a set of target memory cells connected to a target wordline;
 a first wordline and a second wordline, each adjacent to the target wordline; and
control logic, operatively coupled with the memory array, to perform operations comprising:
 causing a program operation to be initiated to program the set of target memory cells of the target wordline to a target programming level;

causing, during a program verify operation of the program operation, a program verify voltage level to be applied to the target wordline to verify programming of the set of target memory cells;

selecting, from a set of pass through read voltage levels, a pass through read voltage level based on the target programming level; and causing, during the program verify operation, a pass through voltage level to be applied to at least one of the first wordline or the second wordline, wherein the pass through voltage level is the pass through read voltage level reduced by an offset value.

2. The memory device of claim 1, the operations further comprising determining the offset value based on the target programming level.

3. The memory device of claim 2, wherein the offset value increases incrementally as the target programming level increases.

4. The memory device of claim 1, the operations further comprising determining the offset value based on a loss level associated with a wordline group comprising the target wordline.

5. The memory device of claim 4, wherein the offset value comprises a first offset value in response to determining the wordline group is associated with a low loss level, and wherein the offset value comprises a second offset value in response to determining the wordline group is associated with a high loss level, and wherein the first offset value is less than the second offset value.

6. The memory device of claim 1, wherein the pass through voltage level comprises a first pass through voltage level applied to the first wordline, and wherein a second pass through voltage level based on a second offset value is caused to be applied to the second wordline.

7. The memory device of claim 6, wherein the offset value is less than the second offset value.

8. A method comprising:

causing, by a processing device, a program operation to be initiated to program a set of target memory cells of a target wordline of a memory device to a target programming level;

causing, during a program verify operation of the program operation, a program verify voltage level to be applied to the target wordline to verify programming of the set of target memory cells;

selecting, from a set of pass through read voltage levels, a pass through read voltage level based on the target programming level; and causing, during the program verify operation, a pass through voltage level to be applied to at least one of a first wordline or a second wordline, wherein the pass through voltage level is the pass through read voltage level reduced by an offset value.

9. The method of claim 8, further comprising determining the offset value based on the target programming level.

10. The method of claim 9, wherein the offset value increases incrementally as the target programming level increases.

11. The method of claim 8, further comprising determining the offset value based on a loss level associated with a wordline group comprising the target wordline.

12. The method of claim 11, wherein the offset value comprises a first offset value in response to determining the wordline group is associated with a low loss level, and wherein the offset value comprises a second offset value in response to determining the wordline group is associated with a high loss level, and wherein the first offset value is less than the second offset value.

13. The method of claim 8, wherein the pass through voltage level comprises a first pass through voltage level applied to the first wordline, and wherein a second pass through voltage level based on a second offset value is caused to be applied to the second wordline.

14. The method of claim 13, wherein the offset value is less than the second offset value.

15. A non-transitory computer-readable storage medium comprising instructions that, when executed by a processing device, cause the processing device to perform operations comprising:

causing a program operation to be initiated to program a set of target memory cells of a target wordline of a memory device to a target programming level;

causing, during a program verify operation of the program operation, a program verify voltage level to be applied to the target wordline to verify programming of the set of target memory cells;

selecting, from a set of pass through read voltage levels, a pass through read voltage level based on the target programming level; and causing, during the program verify operation, a pass through voltage level to be applied to at least one of a first wordline or a second wordline, wherein the pass through voltage level is the pass through read voltage level reduced by an offset value.

16. The non-transitory computer-readable storage medium of claim 15, the operations further comprising determining the offset value based on the target programming level.

17. The non-transitory computer-readable storage medium of claim 16, wherein the offset value increases incrementally as the target programming level increases.

18. The non-transitory computer-readable storage medium of claim 16, the operations further comprising determining the offset value based on a loss level associated with a wordline group comprising the target wordline.

19. The non-transitory computer-readable storage medium of claim 18, wherein the offset value comprises a first offset value in response to determining the wordline group is associated with a low loss level, and wherein the offset value comprises a second offset value in response to determining the wordline group is associated with a high loss level, and wherein the first offset value is less than the second offset value.

20. The non-transitory computer-readable storage medium of claim 15, wherein the pass through voltage level comprises a first pass through voltage level applied to the first wordline, and wherein a second pass through voltage level based on a second offset value is caused to be applied to the second wordline, and wherein the offset value is less than the second offset value.

* * * * *